U nited States Patent Office 2,708,092
Patented May 10, 1955

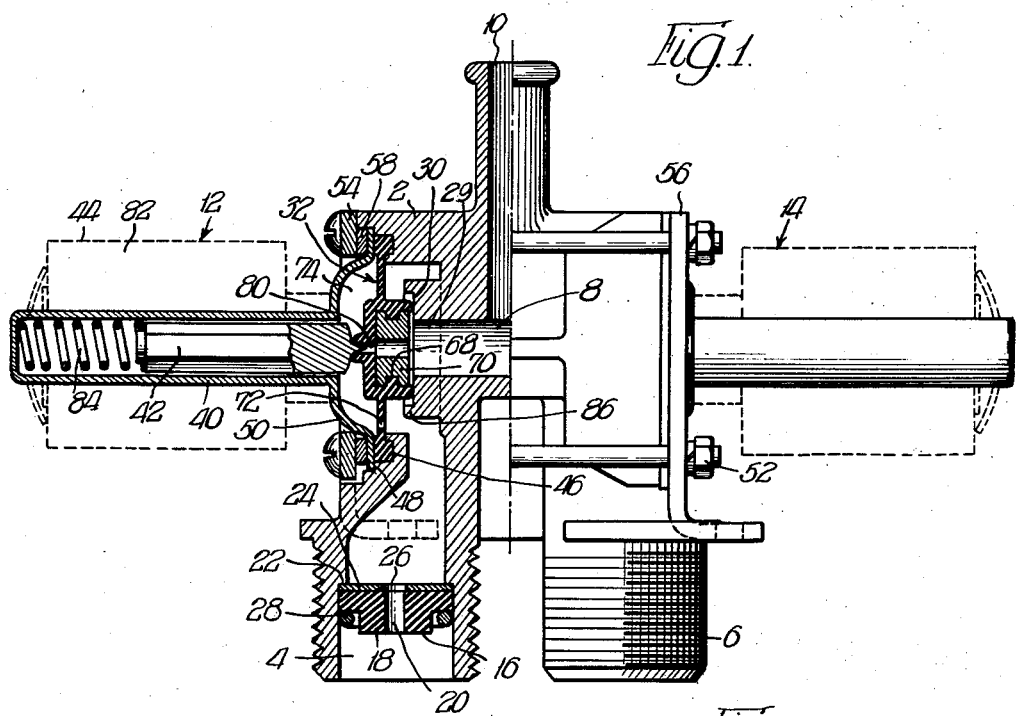

2,708,092

CONTROL FOR FLUID MIXING VALVE

Thomas R. Smith, Newton, Iowa, assignor to The Maytag Company, Newton, Iowa, a corporation of Delaware Application June 10, 1950, Serial No. 167,284

6 Claims. (Cl. 251—30)

The present invention realtes to vaves and more particularly to that type of valve wherein the fluid pressure from the inlet side is utilized for opening and closing the valve.

Among the objects of the invention is to provide an improved diaphragm type valve wherein the operation is controlled by an auxiliary or pilot valve.

More particularly, the present invention contemplates an improved diaphragm type valve assembly adapted for use in supplying hot, cold, or warm water to a washing machine and the like and embodying means in its construction whereby the same may be automatically controlled by a sequence timer.

Another object of the present invention is to provide a valve of the type hereinabove specified wherein novel structure is incorporated in the valve in the form of an improved diaphragm and means for mounting and positioning the same in the valve casing.

Still another object of the invention is to provide an improved diaphragm for a valve of the type above indicated in which means is provided in the form of a stop member to limit movement of the diaphragm in the closing of the valve to prevent injury to the diaphragm, yet effectively cutting off the flow of liquid through the valve.

The present invention also includes as a desideratum further means for preventing vibration of the diaphragm which results in turbulent and surging flow of liquid through the valve, thus facilitating the smooth and uniform flow of liquid without objectionable disturbances.

Other objects, features, capabilities and advantages are comprehended by the invention as will later appear and as are inherently possessed thereby.

Referring to the drawings:

Figure 1 is a plan view of a valve assembly made in accordance with the present invention having parts thereof broken away and shown in cross-section to disclose the valve construction in detail;

Figure 2 is a plan view of a flexible diaphragm member forming a part of the valve assembly; and Figure 3 is a view in cross-section of the diaphragm member shown in Figure 2, disclosing more particularly its cooperative relation with a pilot valve.

Referring now more in detail to the drawings, an embodiment selected to illustrate the present invention is shown as being incorporated in a mixing valve for use in supplying hot and cold water, or a mixture of the same, to the container or tub for a washing machine or the like, and more particularly the said illustrative example of the invention contemplates the provision of means for automatically supplying such liquid to said tub or the like.

In the form in which the invention is illustrated in the drawings, the valve comprises a valve body 2 having an inlet 4 adapted to be connected to a source of cold water and an inlet 6 adapted to be connected to a source of hot water. The inlets 4 and 6 communicate with a mixing chamber 8 in which hot and cold water are mixed in suitable proportions, as desired, and discharged through a single outlet 10 connected, as by means of a flexible hose or the like, to the tub of a washing machine or the like. Intermediate the inlets 4 and 6 and the outlet 10 are valve assemblies 12 and 14 for controlling the flow of hot and cold water into the mixing chamber 8 and thence out through the outlet 10. It is, of course, understood that either of the valve assemblies 12 or 14 may be individually operated or operated simultaneously to selectively supply hot or cold, or a mixture of hot and cold, water through the outlet 10 to the washing tub or the like.

Mounted within each of the inlets 4 and 6 is a flow control device 16 for controlling the flow of water to the mixing chamber 8.

Inasmuch as the valve assemblies 12 and 14, as well as the flow control devices 16, are of similar construction, reference will be hereinafter made to the details of such structure as is shown incorporated in the cold water side of the valve.

The flow control device 16 constitutes the subject matter of my co-pending application, Serial No. 167,283, filed June 10, 1950, now Patent No. 2,644,476, the same comprising a member 18 formed of resilient rubberlike material and having a centrally disposed orifice 20 extending therethrough, the cross-sectional area of which varies inversely with variations of pressure in the cold water inlet, whereby substantially equal amounts of cold water are delivered to the mixing chamber in equal intervals of time irrespective of the variation in the water pressure. The inlet 4 is provided with an annular shoulder 22 forming a seat for an abutment member 24 disposed in seating relation with the member 18, the abutment member 24 having an aperture 26 of slightly greater diameter than the opening 20 in the member 18. The member 18 is held in place by an expansible spring member 28 engaging the inner wall of the outlet 4 for holding the member 18 in place. It is, of course, contemplated that the flow characteristics of the members 18 may be different whereby the quantity of either hot or cold water may vary with respect to the other during any interval of time, as more particularly described in said copending application. Further details of construction of this flow control device are recited in the said copending application, and since the same constitutes no part of the present invention, no further detailed description of the structure will be made herein.

The present invention is directed particularly to a valve assembly of the diaphragm type controlled by a pilot valve for opening and closing the valve port as desired. Such valve assembly is constituted by a port 29 intermediate the inlet 4 and mixing chamber 8, the same being provided with an annular valve seat 30 surrounding the same and adapted to be engaged in sealing relation by a flexible diaphragm 32 whereby flow of liquid from the inlet 4 to the mixing chamber 8 is controlled. The flexible diaphragm member 32, as more clearly shown in Figures 2 and 3 of the drawings, is constructed of a flexible rubberlike material having a central portion 34, an intermediate annular web section 36 and an outer enlarged peripheral ring portion 38. The diaphragm 32 is mounted in the valve body 2 through the medium of its enlarged peripheral ring portion 38 by securing means including a housing 40 for the armature or plunger 42 of a solenoid 44. The enlarged peripheral ring portion 38 is seated within the annular groove 46 formed in the valve body 2 which is provided with an inner shoulder 48 for a purpose to be hereinafter described.

In the present illustrative embodiment of the invention, the housing 40 is formed with an annular flange 50 adapted to engage the enlarged peripheral ring portion 38 of the diaphragm and through the medium of the bolts, such as 52, the flange 50 compresses the enlarged peripheral ring portion 38 therebetween and the groove 46 to provide a solid anchor for holding and centering the diaphragm in operative position, and which compression of the ring portion causes the same to act as a self-sealing gasket for forming a fluid-tight joint between the valve body 2 and the annular flange 50 of the housing 40. The clamping and securing means further includes the bracket members 54 and 56 which, through the medium of a gasket, such as 58, causes the housing structure 50 to be brought down into compressing relation with the enlarged peripheral ring portion 38, the amount of compression being limited by the engagement of the annular flange 50 with the shoulder 48 so as not to unduly compress the ring portion 38 and to cause damage thereto. The brackets 54 and 56 are provided with suitable means whereby the valve may be mounted in any desired manner to frame structure of a washing machine or the like.

The central portion 34 comprises a central web 60 and a laterally or outwardly projecting annular sealing lip 62 having its outer marginal edge curved, as at 64, to provide stream-lined characteristics to improve the flow characteristics of liquid through the valve and to provide a point contact for sealing. The annular sealing lip 62, when the valve assembly is in its closed position, is adapted to engage the seat 30 to cut off the flow of liquid through the valve. The sealing lip 62 is further provided with an inwardly and radially extending annular ring 66 integrally formed therewith and adapted to engage within the groove 68 formed in the outer peripheral surface of a seal stop 70 to hold the same in assembled relation with the diaphragm 32. This seal stop which is made of metal, or other relatively rigid material, is provided with a central opening 71 extending therethrough and terminates short of and in spaced relation to the outer end 64 of the sealing lip 62. This stop member 70 provides a positive stop for the closing movement of the diaphragm in its sealing position and also serves as a reinforcing member for the central portion of the diaphragm about the opening 80 and the sealing lip 62. It will be clearly apparent that movement of the sealing lip 62 is limited by the engagement of the stop member 70 with the seat 30 to prevent undue compression of the sealing lip 62.

The diaphragm 32 has a small orifice or opening 72 in the intermediate annular web section 36 which is in communication at all times with the high pressure side of the inlet 4 and the control chamber 74 formed between the diaphragm 32 and the housing structure 40. The plunger 42, which has heretofore been described as a part of the solenoid 44, also constitutes a valve member of a pilot valve for controlling the opening and closing of the diaphragm 32. The plunger 42 is provided with the conically shaped end piece 76 which seats with the sealing lip 78 extending outwardly of the central web 60 and which defines an opening 80 of greater cross-sectional area than the orifice 72 concentrically disposed in alignment with the opening 71 of the stop 70 and extending through said central web 60. The solenoid 44 further includes a conventional field winding 82 embracing the housing 40 which is energized from any suitable source of electricity for retracting the armature or plunger 42 from its engagement with the lip 78 when it is desired to actuate the valve mechanism. The solenoid 44 may be controlled electrically by any sequence timer, if so desired. Interposed between the end of the plunger 42 and the outer end of the housing 40 is a coil spring 84 for returning the plunger to its seating relation with the sealing lip 78 upon deenergization of the winding 82.

In order to reduce turbulence in the flow of liquid from the inlet 4 to the mixing chamber 8, an annular raised rim 86 is provided around the outer periphery of the valve seat in spaced relation to the sealing lip 62 of the diaphragm. It has been found that in the absence of such annular rim liquid acting upon one side of the sealing portion of the diaphragm causes the same to vibrate which results in surging of the liquid through the valve. By providing the annular rim, however, relative smooth and uniform flow of liquid through the valve assembly is facilitated without objectionable disturbances.

In the operation of the valve made in accordance with the present invention, the high pressure side thereof is connected through the inlet 4 to a suitable source of supply for cold water. With the valve parts in the position as shown in Figure 1 of the drawings, the water will flow through the diaphragm aperture 72 into the diaphragm or control chamber 74 until the same is filled. Inasmuch as there is little or no pressure on the outlet side of the valve, the fluid pressure in the chamber 74 holds the diaphragm 32 in seating relation with the valve seat 30. When the solenoid 44 is energized by passing current through the solenoid field winding 82, the armature or plunger 42 will be moved outwardly against the compressive action of the spring 84 so as to unseat the same with the pilot valve opening 80. As soon as this unseating of the pilot valve member 42 with the pilot valve opening 80 takes place, the fluid under pressure in the chamber 74 flows out through the pilot valve opening 80 and into the low side of the valve into the mixing chamber 8.

As a fluid pressure is relieved in the control or diaphragm chamber 74 due to the flow of fluid out of the chamber through the opening 80 at a greater rate than it enters through the orifice 72, the fluid pressure on the inlet side of the valve is effective on the innerside of the flexible diaphragm to force or flex the same outwardly away from its seating position on the seat 30 to permit flow of fluid from the inlet 4 through the port 28 to the mixing chamber 8, and thence through the outlet 10 into the washing tub or the like. So long as the solenoid 44 is energized, the diaphragm 32 will remain in its open position to permit flow of fluid in the manner indicated. When the solenoid 44 is deenergized, however, the plunger 42, under the action of the spring 84, is moved into its seating relation with the pilot valve opening 80 whereby fluid pressure is built up in the diaphragm chamber 74 from the high side of the valve through the opening 72 to maintain the diaphragm in its closed and seating relation with the valve seat 30. This sealing relation of the diaphragm with respect to the valve seat is maintained inasmuch as the total area on the outer side of the diaphragm, namely, that area exposed to fluid pressure within the control chamber 74, is greater than the area on the underside of the diaphragm.

It will be clearly apparent that the operation of the valve through the solenoid, which in turn may be electrically controlled by a sequence timer, is merely illustrative of one way in which the valve may be operated. It will also be apparent that in accordance with the present disclosure, the solenoids for the hot and cold water supply can be operated either individually or simultaneously, depending upon whether it is desired to introduce hot, cold, or a mixture of hot and cold water to the washing machine or the like.

While I have herein described and upon the drawings shown an illustrated embodiment of the invention, it is to be understood that the invention is not limited thereto, but may comprehend other constructions, arrangements of parts, details and features without departing from the spirit of the invention.

It is claimed:

1. In a valve, the combination of a valve body having an inlet, an outlet and a port therebetween, said port having an annular seat, a valve assembly including a flexible diaphragm having an outer web portion mounted in said valve body and having a centrally disposed portion provided with an annular sealing lip projecting therefrom and being adapted to have sealing relation with said seat, said diaphragm being freely suspended by said web portion when the same is in its unsealed position, a stop member of relatively rigid material embraced by said sealing lip and terminating inwardly of the end thereof for limiting movement of said sealing lip in its sealing relation to said seat, and said seat having an annular rim disposed outwardly of and in spaced relation to said sealing lip.

2. A valve construction according to claim 1, wherein the centrally disposed portion and said stop member have intercommunicating openings therethrough.

3. A valve construction according to claim 2, wherein the opening in the centrally disposed portion terminates in an outwardly extending pilot valve sealing lip.

4. A diaphragm valve member formed from flexible material and characterized by having a centrally disposed portion provided with a laterally extending annular sealing lip, an intermediate web portion and an enlarged peripheral ring portion, said sealing lip having an annular inwardly extending ring portion integral therewith, and a stop member embraced by said sealing lip and having a peripheral groove engaged by said last named ring portion for interlocking the same with said sealing lip, said web portion having an opening extending therethrough, and another opening provided in said stop member and said centrally disposed portion, the latter of which terminates in an outwardly extending pilot valve sealing lip.

5. A diaphragm valve member formed from flexible material and characterized by having a centrally disposed portion provided with a laterally extending annular sealing lip, an intermediate web portion and a peripheral ring portion, said sealing lip having an annular inwardly extending ring portion integral therewith, and a stop member embraced by said sealing lip and having a peripheral groove engaged by said last named ring portion for interlocking the same with said sealing lip, said web portion having an opening extending therethrough, and another opening provided in said stop member and said centrally disposed portion, the latter of which terminates in an outwardly extending pilot valve sealing lip.

6. A diaphragm valve member formed from flexible material and characterized by having a centrally disposed portion provided with a laterally extending annular sealing lip, an intermediate web portion and a peripheral ring portion, said sealing lip having an annular inwardly extending ring portion integral therewith, and a stop member embraced by said sealing lip and having a peripheral groove engaged by said last named ring portion for interlocking the same with said sealing lip, said stop member terminating inwardly in spaced relation to the edge of said sealing lip, said web portion having an opening extending therethrough, and another opening provided in said stop member and said centrally disposed portion, the latter of which terminates in an outwardly extending pilot valve sealing lip.

References Cited in the file of this patent

UNITED STATES PATENTS

| Number | Name | Date |
|---|---|---|
| 1,939,911 | McCune | Dec. 19, 1933 |
| 1,986,475 | Hewitt | Jan. 1, 1935 |
| 2,121,549 | McNeal | June 21, 1938 |
| 2,292,477 | Ray | Aug. 11, 1942 |
| 2,305,151 | Fields | Dec. 15, 1942 |
| 2,324,880 | Rogers et al. | July 20, 1943 |
| 2,403,028 | Smith | July 2, 1946 |
| 2,417,494 | Hoof | Mar. 18, 1947 |
| 2,537,308 | Hansen | Jan. 9, 1951 |
| 2,542,254 | Lamb | Feb. 20, 1951 |
| 2,562,315 | Kempton | July 31, 1951 |
| 2,610,021 | Smith | Sept. 9, 1952 |
| 2,623,542 | Obermaier | Dec. 30, 1952 |

FOREIGN PATENTS

| Number | Country | Date |
|---|---|---|
| 596,533 | Great Britain | of 1948 |
| 927,019 | France | Apr. 28, 1947 |